(12) United States Patent
Slinker

(10) Patent No.: US 9,665,257 B2
(45) Date of Patent: May 30, 2017

(54) INTERACTIVE MODIFICATION OF SPACING CONSTRAINTS OF GENEALOGICAL CHARTS WITH LIVE FEEDBACK

(75) Inventor: Geoffrey Scott Slinker, Provo, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 992 days.

(21) Appl. No.: 12/647,767

(22) Filed: Dec. 28, 2009

(65) Prior Publication Data
US 2011/0161805 A1    Jun. 30, 2011

(51) Int. Cl.
| | | |
|---|---|---|
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |
| G06F 3/0484 | (2013.01) | |
| G06F 3/0483 | (2013.01) | |

(52) U.S. Cl.
CPC ........ *G06F 3/04845* (2013.01); *G06F 3/0483* (2013.01); *G06F 2203/04806* (2013.01)

(58) Field of Classification Search
CPC ......... G06F 2203/04806; G06F 3/0483; G06F 17/30572; G06F 17/30961; G06F 3/04806; G06F 4/0483; G06F 4/04806

USPC ................ 715/833, 243, 244, 245; 434/154; 707/797
See application file for complete search history.

(56) References Cited

U.S. PATENT DOCUMENTS

| | | | | |
|---|---|---|---|---|
| 5,588,108 A | * | 12/1996 | Kumar | ................ G06F 3/04845 715/765 |
| 6,085,202 A | * | 7/2000 | Rao et al. | ...................... 715/201 |
| 6,111,578 A | * | 8/2000 | Tesler | ........................... 715/850 |

(Continued)

*Primary Examiner* — Manglesh M Patel
*Assistant Examiner* — Nicholas Hasty
(74) *Attorney, Agent, or Firm* — Kilpatrick Townsend & Stockton LLP

(57) ABSTRACT

Methods, devices and systems are described for implementing interactive modification of spacing constraints of genealogical charts. The method includes displaying, on a display device of a computer system, a user interface for displaying one or more genealogical charts including one or more nodes. The user interface includes a horizontal slider and a vertical slider for manipulating the one or more geological charts' size. The one or more geological charts include page breaks representing a number of pages. The method further includes receiving, from an input device of the computer system, manipulation input for one or more of the vertical slider or the horizontal slider. Then, in response to receiving the manipulation input, providing real-time graphical feedback representing the manipulation in the display of the one or more genealogical charts. The real-time graphical feedback includes expanding and/or contracting the one or more genealogical charts such that the number of page for the one or more geological charts is automatically increased or decreased to accommodate the size of the one or more geological charts.

19 Claims, 13 Drawing Sheets

(56) References Cited

U.S. PATENT DOCUMENTS

| | | | |
|---|---|---|---|
| 6,237,006 B1* | 5/2001 | Weinberg et al. | 707/797 |
| 6,570,567 B1* | 5/2003 | Eaton | G06T 11/206 |
| | | | 345/428 |
| 7,594,168 B2* | 9/2009 | Rempell | G06F 8/20 |
| | | | 715/234 |
| 7,603,632 B1* | 10/2009 | Aamodt et al. | 715/853 |
| 8,539,359 B2* | 9/2013 | Rapaport et al. | 715/751 |
| 2002/0116420 A1* | 8/2002 | Allam et al. | 707/526 |
| 2003/0085931 A1* | 5/2003 | Card et al. | 345/853 |
| 2005/0028111 A1* | 2/2005 | Schrag et al. | 715/851 |
| 2008/0108027 A1* | 5/2008 | Sallin | 434/154 |
| 2008/0288886 A1* | 11/2008 | Sherwood et al. | 715/772 |
| 2009/0002391 A1* | 1/2009 | Williamson et al. | 345/619 |
| 2009/0254814 A1* | 10/2009 | Lai et al. | 715/244 |
| 2010/0318942 A1* | 12/2010 | Banyasad | G06T 11/206 |
| | | | 715/854 |

\* cited by examiner

INTERACTIVE MODIFICATION OF SPACING CONSTRAINTS OF GENEALOGICAL CHARTS WITH LIVE FEEDBACK

BACKGROUND OF THE INVENTION

Previously, methods for controlling the spacing of nodes in a genealogical chart consisted of predefined spacing that was selectable from a menu or by entering a numeric value into an input control of the graphical user interface of a genealogical charting software application. As such, users were required to guess which values would be needed to display the genealogical tree in the most aesthetically pleasing configuration. The user could be required to make several attempts until the desired display configuration was achieved.

Since the acceptance of a chart as "pleasing" by a user is subjective the user needs feedback that is immediate and comprehensive. The comprehensive aspects include visual relationships of each node of a chart relative to the other nodes of the chart and the relationship of the nodes of the chart to the pages and page breaks that make up the chart. Current implementations do not provide live feedback of these comprehensive aspects. Using the current implementations available, the user selects a spacing value and then examines the chart to see if the results are pleasing. The examination may include zooming and panning the chart to see how the nodes relate to each other and to the pages and page breaks.

The following invention serves to remedy these and other problems.

BRIEF SUMMARY OF THE INVENTION

Devices, systems, and methods are described for a novel interactive modification of spacing constraints of genealogical charts with live and immediate feedback.

In some embodiments, a method for implementing interactive modification of spacing constraints of genealogical charts. The method includes displaying, on a display device of a computer system, a user interface for displaying one or more genealogical charts including one or more nodes. The user interface includes a horizontal slider and a vertical slider for manipulating the one or more genealogical charts' size. The one or more genealogical charts include page breaks representing a number of pages. The method further includes receiving, from an input device of the computer system, manipulation input for one or more of the vertical slider or the horizontal slider. Then, in response to receiving the manipulation input, providing real-time graphical feedback representing the manipulation in the display of the one or more genealogical charts. The real-time graphical feedback includes expanding and/or contracting the one or more genealogical charts such that the number of page for the one or more genealogical charts is automatically increased or decreased to accommodate the size of the one or more genealogical charts.

In still other embodiments, a computer-readable storage medium having a computer-readable program embodied therein for implementing interactive modification of spacing constraints of genealogical charts. The computer-readable medium includes displaying, on a display device of a computer system, a user interface for displaying one or more genealogical charts including one or more nodes. The user interface includes a horizontal slider and a vertical slider for manipulating the one or more genealogical charts' size. The one or more genealogical charts include page breaks representing a number of pages. The computer-readable medium further includes receiving, from an input device of the computer system, manipulation input for one or more of the vertical slider or the horizontal slider. Then, in response to receiving the manipulation input, providing real-time graphical feedback representing the manipulation in the display of the one or more genealogical charts. The real-time graphical feedback includes expanding and/or contracting the one or more genealogical charts such that the number of page for the one or more genealogical charts is automatically increased or decreased to accommodate the size of the one or more genealogical charts.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components.

DETAILED DESCRIPTION OF THE INVENTION

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provide solutions (including without limitation, devices, systems, methods, software programs, and the like) for interactive modification of spacing constraints of genealogical charts with live and immediate feedback. Aspects of the present invention improves the prior art by allowing the user to use "slider controls" instead of numeric input controls to control and change the spacing of the chart. As the user manipulates the slider controls the chart updates in real time so the user can stop manipulating the slider controls when the chart is pleasing to the user. Further, the present invention shows the pages and page breaks so that the user can see how the changes affect the chart and the nodes relationship (positions) to the pages and page breaks. The present invention automatically zooms the chart if necessary to show the user a comprehensive view of the chart and the results of the changes in spacing. During the use of the present invention, the settings can be restored or reset to the initial spacing values and any changes can be ignored or canceled thus restoring the chart to the initial state.

Embodiments of the present invention work for vertically and horizontally oriented genealogical charts giving live/real-time feed back as the spacing slider controls are manipulated showing the relationship of the nodes to the other nodes and the relationship of the nodes to the pages and page breaks. Furthermore, aspects of the present invention actively update the chart and the view of the chart so the user can create a chart that they find pleasing.

Figure 1:
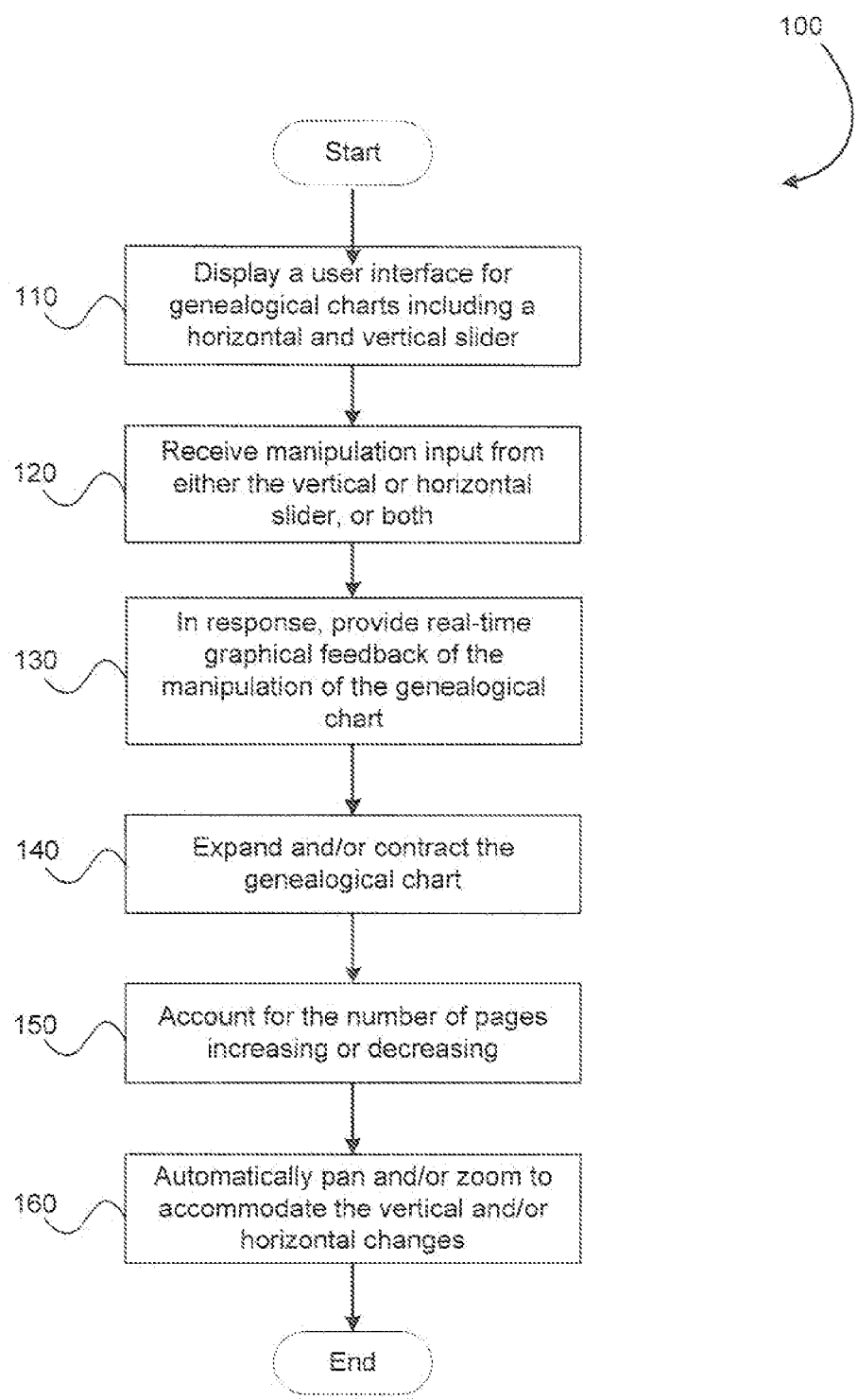
FIG. 1 is a simplified flow diagram of an embodiment of a method for implementing interactive modification of spacing constraints of genealogical charts with live and immediate feedback.

FIG. 1 is a simplified flow diagram of an embodiment of a method 100 for implementing interactive modification of spacing constraints of genealogical charts with live and immediate feedback. In one embodiment, a genealogical chart includes a familial connections represented by interconnected nodes which represent familial lineage connections. In a further embodiment, the nodes may be connected using a directed graph; however, other graph types may be used.

At block 105, a graphical user interface for displaying and manipulating genealogical charts may be provided. The user interface may include horizontal and/or vertical sliders (see at least FIGS. 2 and 3). The interface may further include a reset button, a center button, and a no page overlap button (see at least FIGS. 2 and 3). In one embodiment, the reset button is configured to remove any non-saved changes to the orientation of the genealogical chart. In a further embodiment, the center button is configured to center the genealogical chart in the center of the user interface. Further, the no page overlap may be configured to restrict the genealogical chart at page boundaries.

Figure 2:
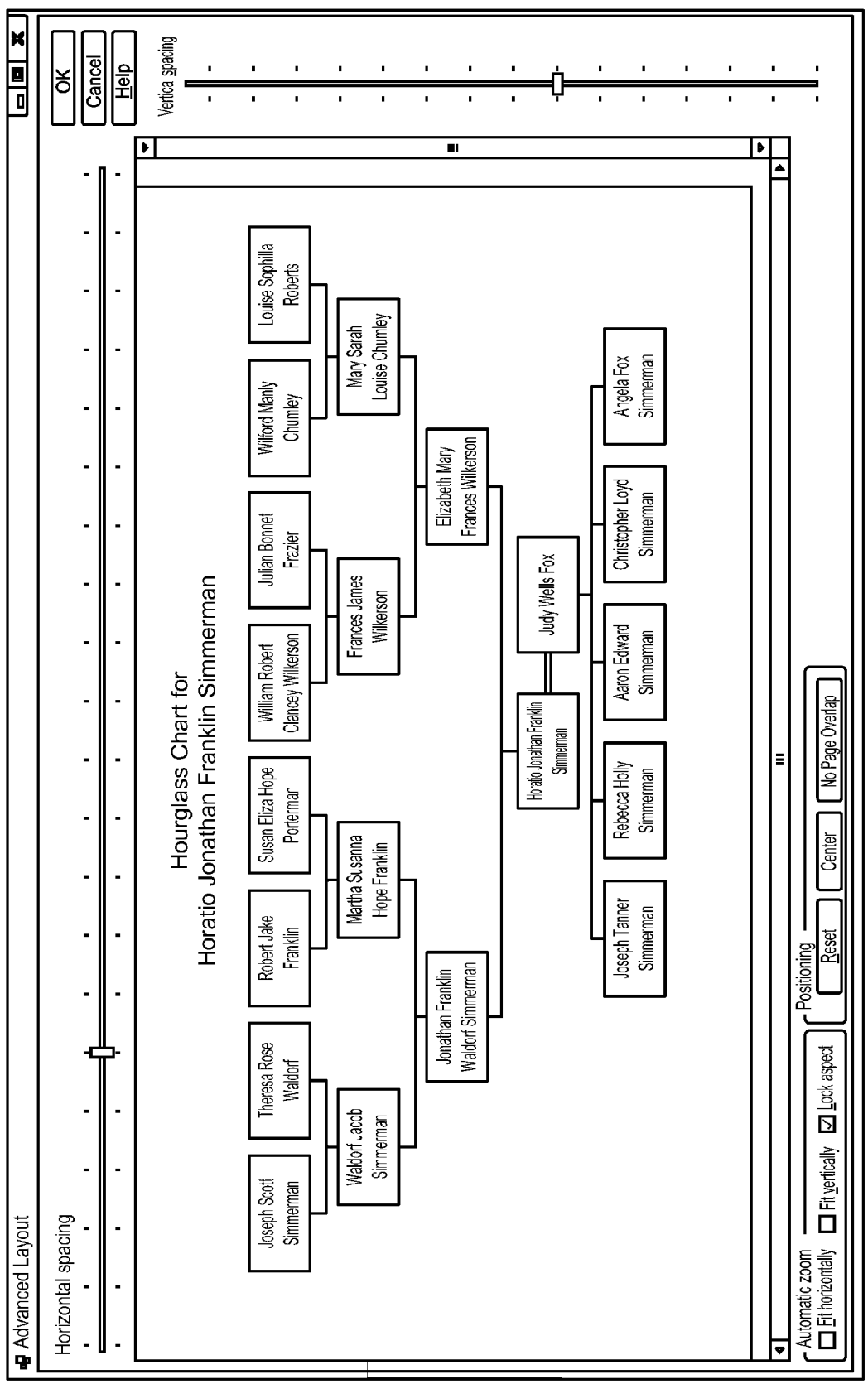
FIG. 2 is a user interface for implementing interactive modification of spacing constraints of genealogical charts with live and immediate feedback.
Figure 3:
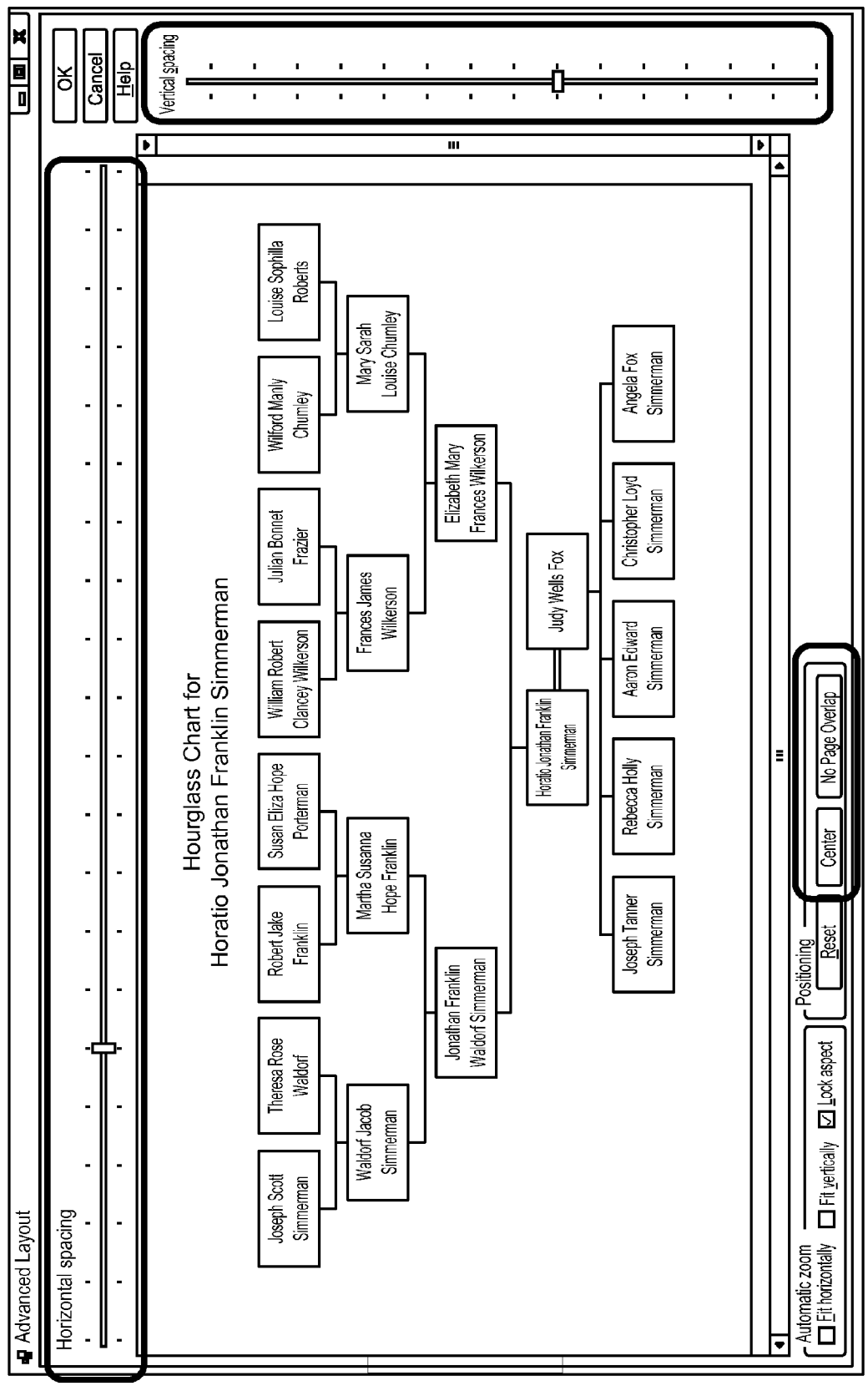
FIG. 3 is a user interface for implementing interactive modification of spacing constraints of genealogical charts with live and immediate feedback.

The user interface may further include zoom options (see at least FIGS. 2 and 3). The zoom options may include fit automatically, fit vertically, and lock aspect buttons. In one embodiment, the fit automatically button may automatically adjust the genealogical chart to fit in the viewing portion of the user interface. Further, the fit vertically button may be configured to automatically adjust the genealogical chart as the vertical spacing is altered. Lastly, the lock aspect button may be configured to lock the aspect orientation of the genealogical chart as the vertical and horizontal spacing is altered.

Method 100 continues at block 120, which receives manipulation input from either the vertical or the horizontal slider, or both. The manipulation input may be received from a mouse, a pointer, a touch-screen, a voice activated control, a stylus, or the like. At block 130, in response to the manipulation input to the vertical or the horizontal sliders, real-time graphical feedback to the display of the genealogical chart is provided. As such, as the sliders are moved, the respective vertical or horizontal spacing between the nodes of the genealogical chart are uniformly spaced closer or further apart, depending on the direction that the slider(s) is moved (block 140).

Figure 5A:
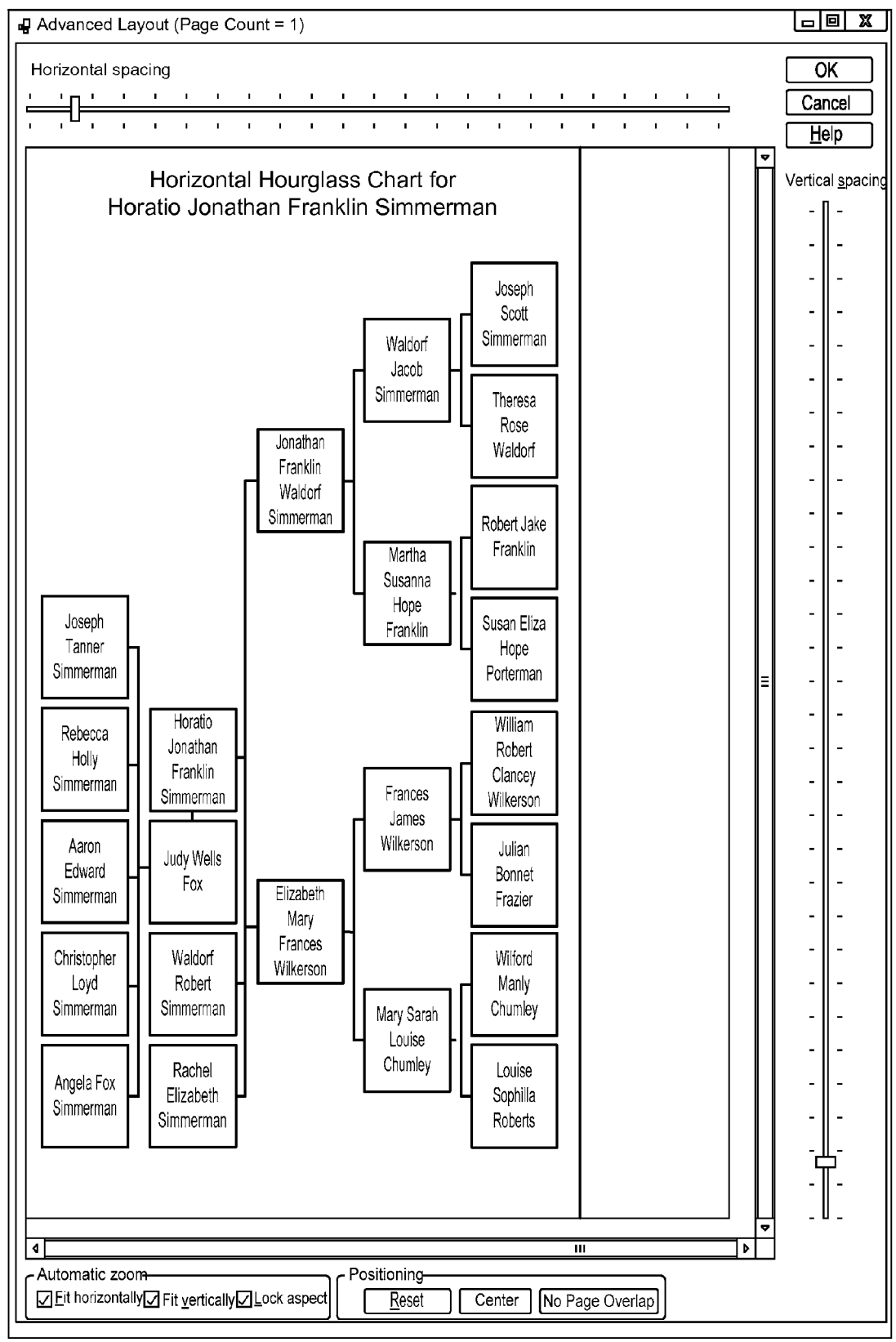
FIGS. 5A, 5B, and 5C are user interfaces for implementing interactive modification of spacing constraints of genealogical charts with live and immediate feedback.
Figure 5B:
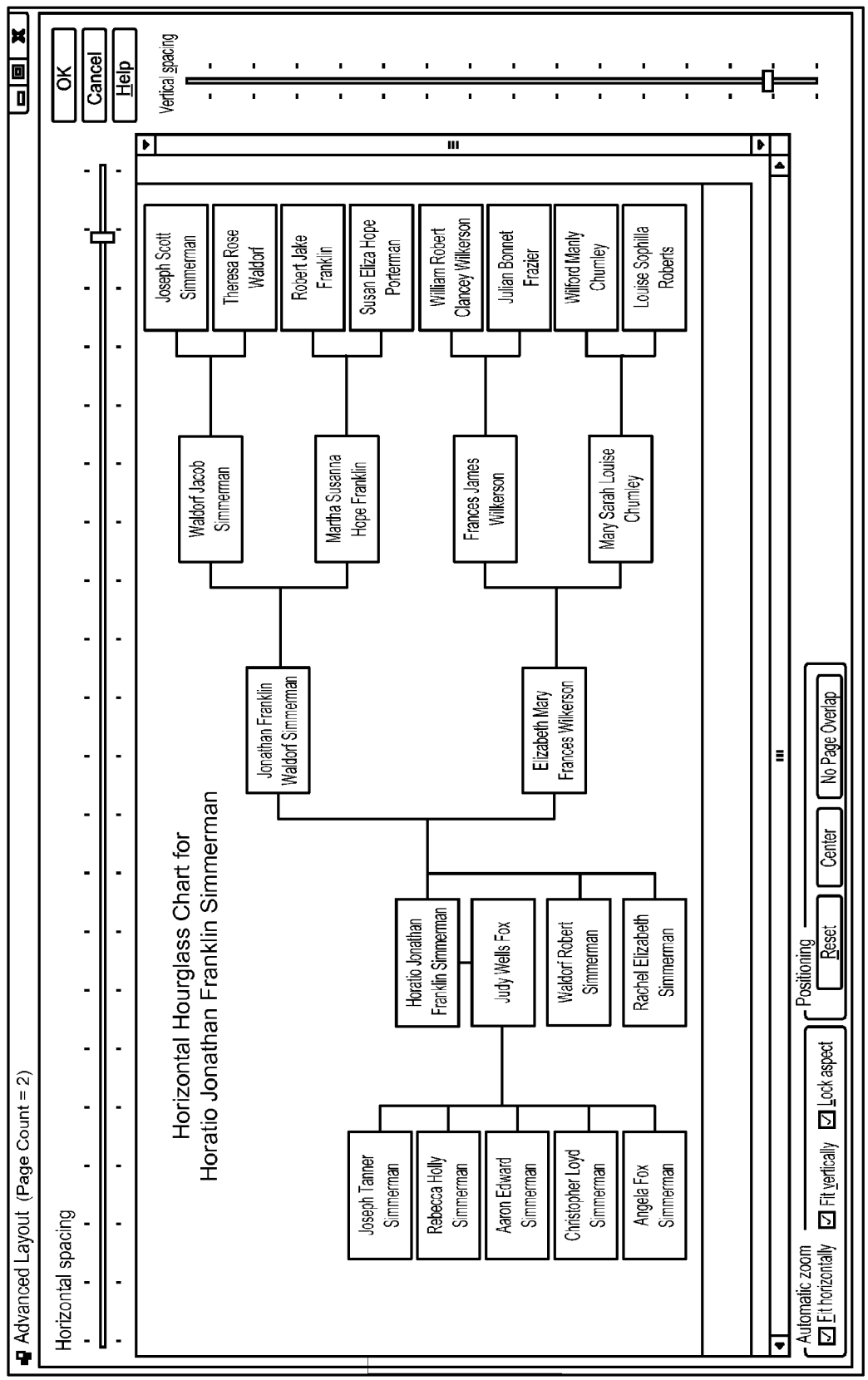
Figure 5C:
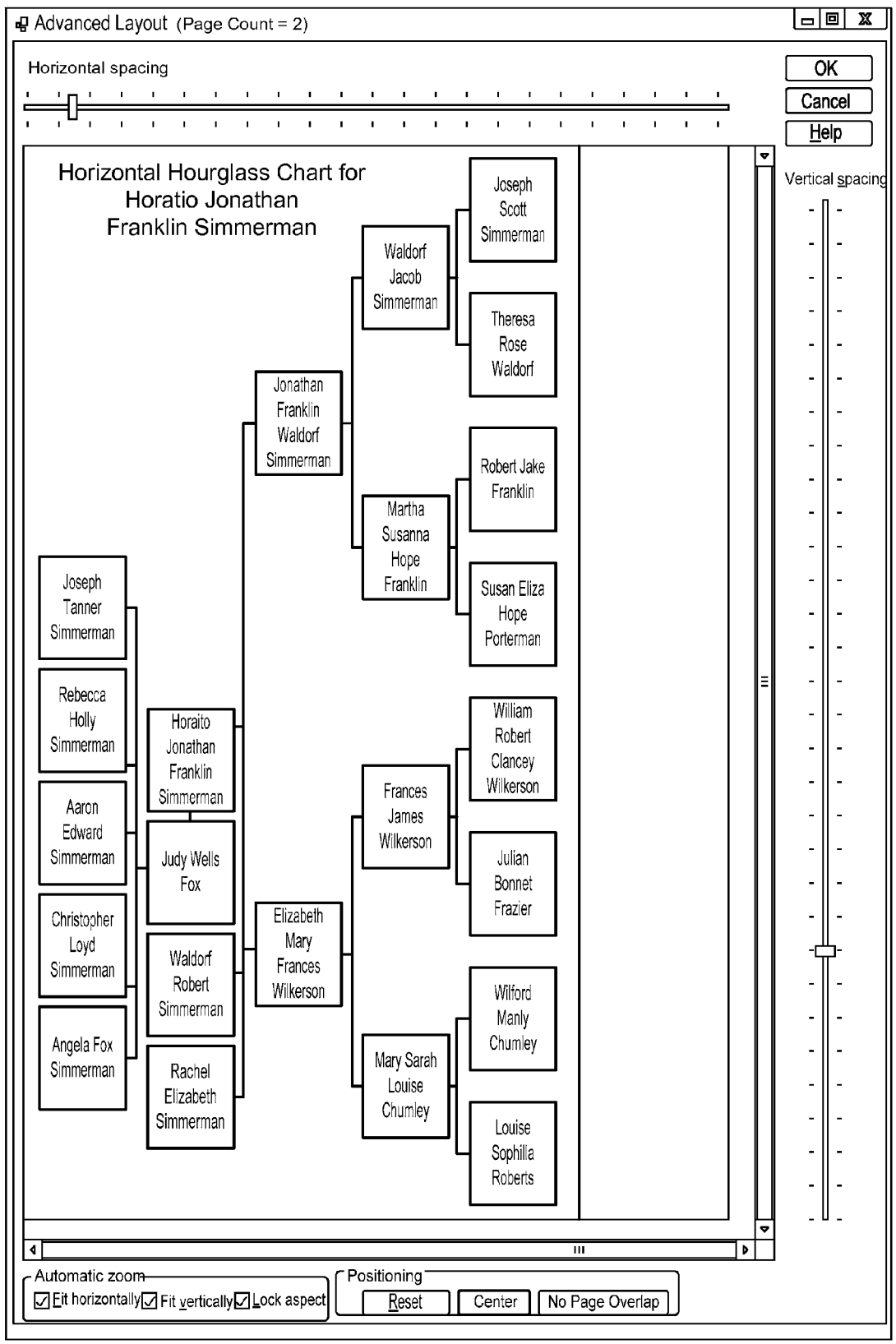

Furthermore, at block 150, as the chart is expended either vertically or horizontally, the user interface automatically accounts for page increases and/or page decreases in either the vertical or horizontal direction (See at least FIGS. 5A-5C). For example, if the horizontal spacing was increased, as the increase occurred, the number of pages needed to accommodate the genealogical chart in the horizontal direction would increase accordingly. Similarly, as the horizontal spacing decreased, the number of pages would in turn decrease. The present invention may be similarly implemented for the vertical direction.

At block 160, the view of the interface is configured to automatically pan and/or zoom to accommodate the changes in the vertical and/or horizontal changes. For example, as both the vertical and/or horizontal spacing is increased, the relative size nodes on the genealogical chart would continue to decrease (pan out) in order to allow for the entire genealogical chart to be shown in the user interface. Similarly, as the vertical and/or horizontal spacing is decreased, the relative size of the nodes on the genealogical chart would continue to increase (zoom in) in order to fill the space within the user interface. Accordingly, the size of the nodes of the genealogical chart are automatically zoomed in or out in response to the vertical and/or horizontal spacing between the nodes.

Thus, the present invention accounts for the size of the genealogical chart, the location of the genealogical chart, the page breaks for the genealogical chart, and the type of genealogical chart. In one embodiment, the type of the genealogical chart may include: a pedigree chart, a descendent chart, an hourglass chart, a fanned chart, a horizontal chart, etc.

FIG. 2 is a user interface for implementing interactive modification of spacing constraints of genealogical charts with live and immediate feedback. FIG. 2 shows a vertically oriented chart known as an hourglass chart. The user interface allows the user to use "slider controls" instead of numeric input controls to control and change the spacing of the chart. As the user manipulates the slider controls the chart updates in real time so the user can stop manipulating the slider controls when the chart is pleasing to the user. The interface also shows the pages and page breaks so that the user can see how the changes affect the chart and the nodes relationship (positions) to the pages and page breaks. As the sliders are moved and manipulated, the view automatically zooms the chart if necessary to show the user a comprehensive view of the chart and the results of the changes in spacing. Furthermore, during the use the settings can be restored or reset to the initial spacing values and any changes can be ignored or canceled, thus restoring the chart to the initial state.

FIG. 3 is a user interface which shows a horizontal slider control, vertical slider control, and center control. In one embodiment, the horizontal spacing control is a slider control at the top of the figure, and the vertical spacing control is a slider control on the right of the figure. Furthermore, two buttons are shown to apply center and no page overlap transformations to the chart. As the horizontal spacing slider control is manipulated the chart updates in real-team. Thus, the resulting "sliding" of the horizontal spacing control to the left reduces the spacing, as shown in FIG. 3.

Figure 4A:
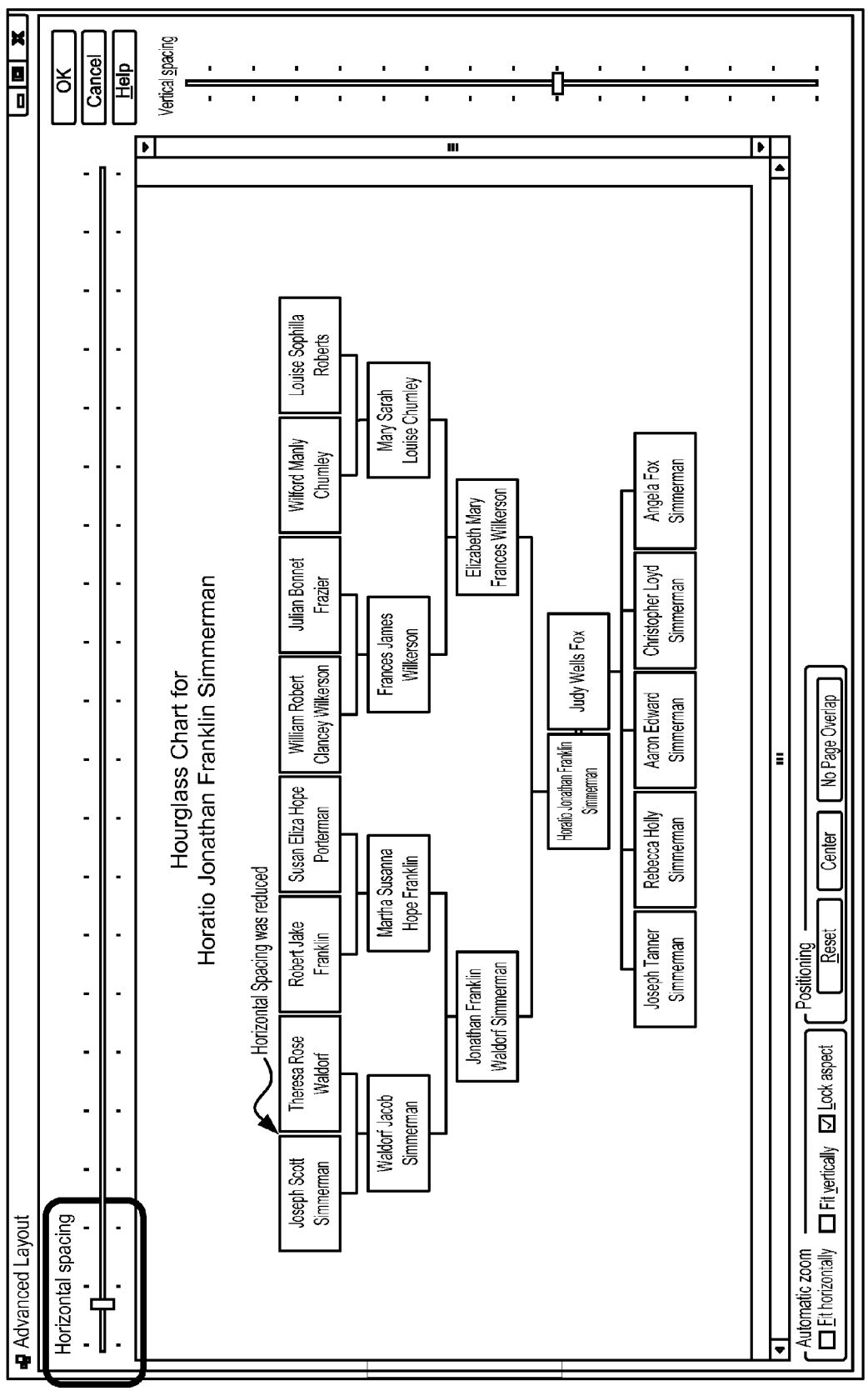
FIGS. 4A and 4B are user interfaces for implementing interactive modification of spacing constraints of genealogical charts with live and immediate feedback.
Figure 4B:
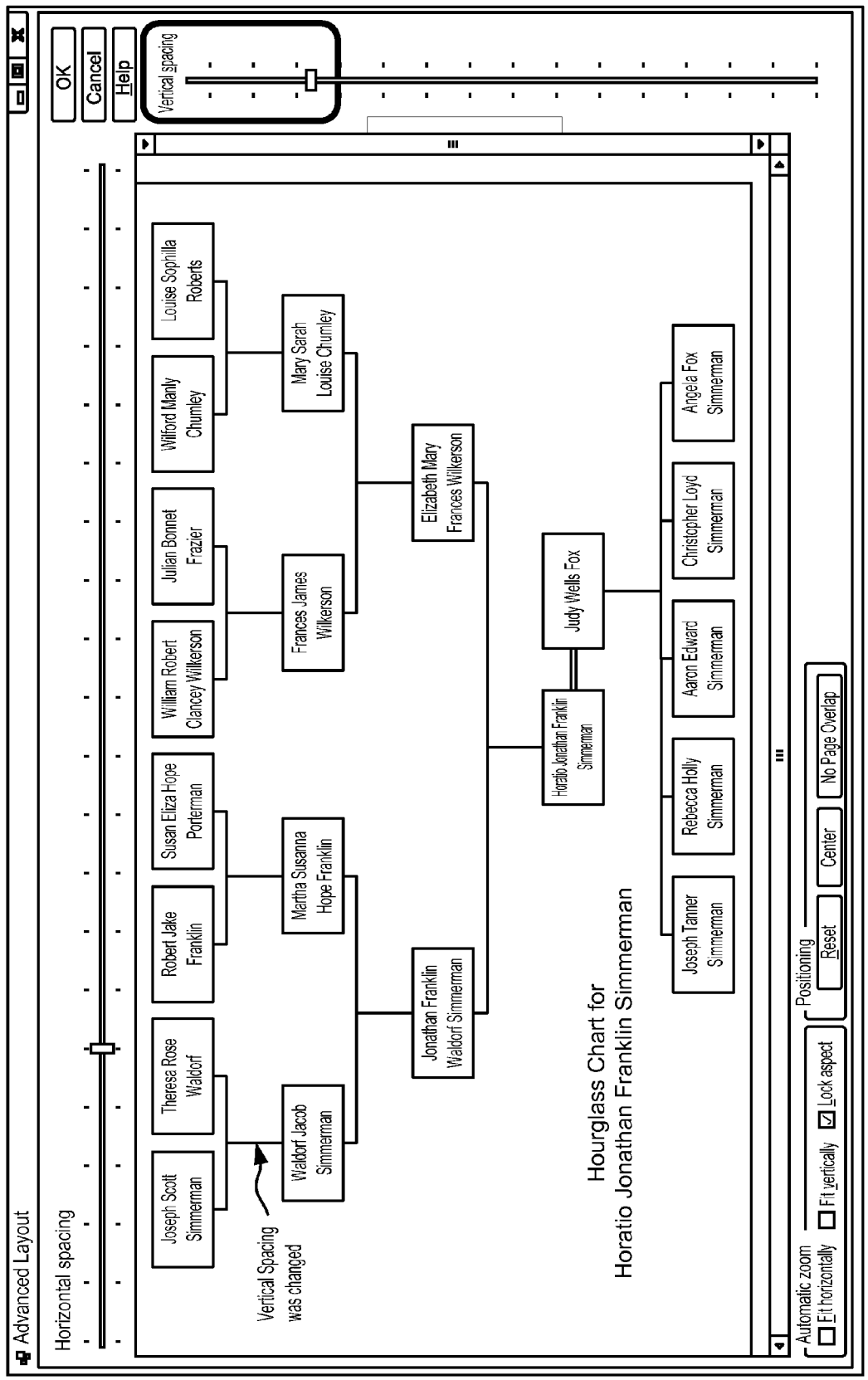

FIG. 4A is a user interface which shows horizontal spacing control which is slid to the left, thus reducing the horizontal spacing of the chart. In one embodiment, the vertical and horizontal spacing can be adjusted independently. FIG. 4B illustrates vertical spacing control slid upward, thus increasing the vertical spacing of the chart. Notice that in FIG. 4B the change in horizontal spacing increased the chart size from one page to two pages. Aspects of the present invention automatically shows the new page and automatically zooms the chart so that the user can see how the spacing relates to the entire chart.

FIG. 5A shows a horizontally oriented chart known as a horizontal hourglass chart. Furthermore, FIG. 5B shows a horizontal spacing change which accounts for the page increase. As such, as the vertical or horizontal spacing is increased or decreased, the number of needed pages to accommodate the chart are increased or decreased, as necessary. FIG. 5C shows a vertical spacing change.

Figure 6A:
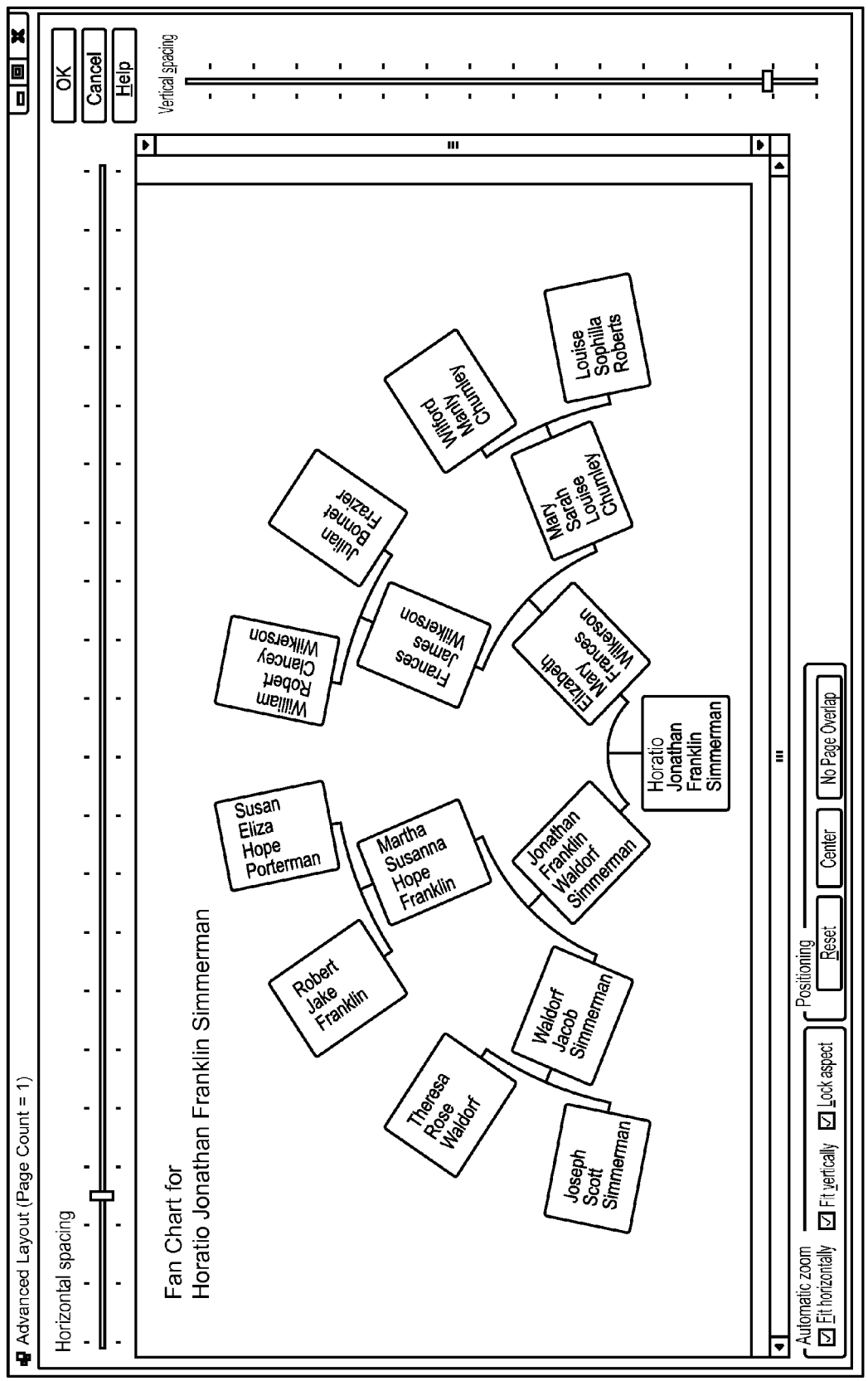
FIGS. 6A, 6B, and 6C are user interfaces for implementing interactive modification of spacing constraints of genealogical charts with live and immediate feedback.
Figure 6B:
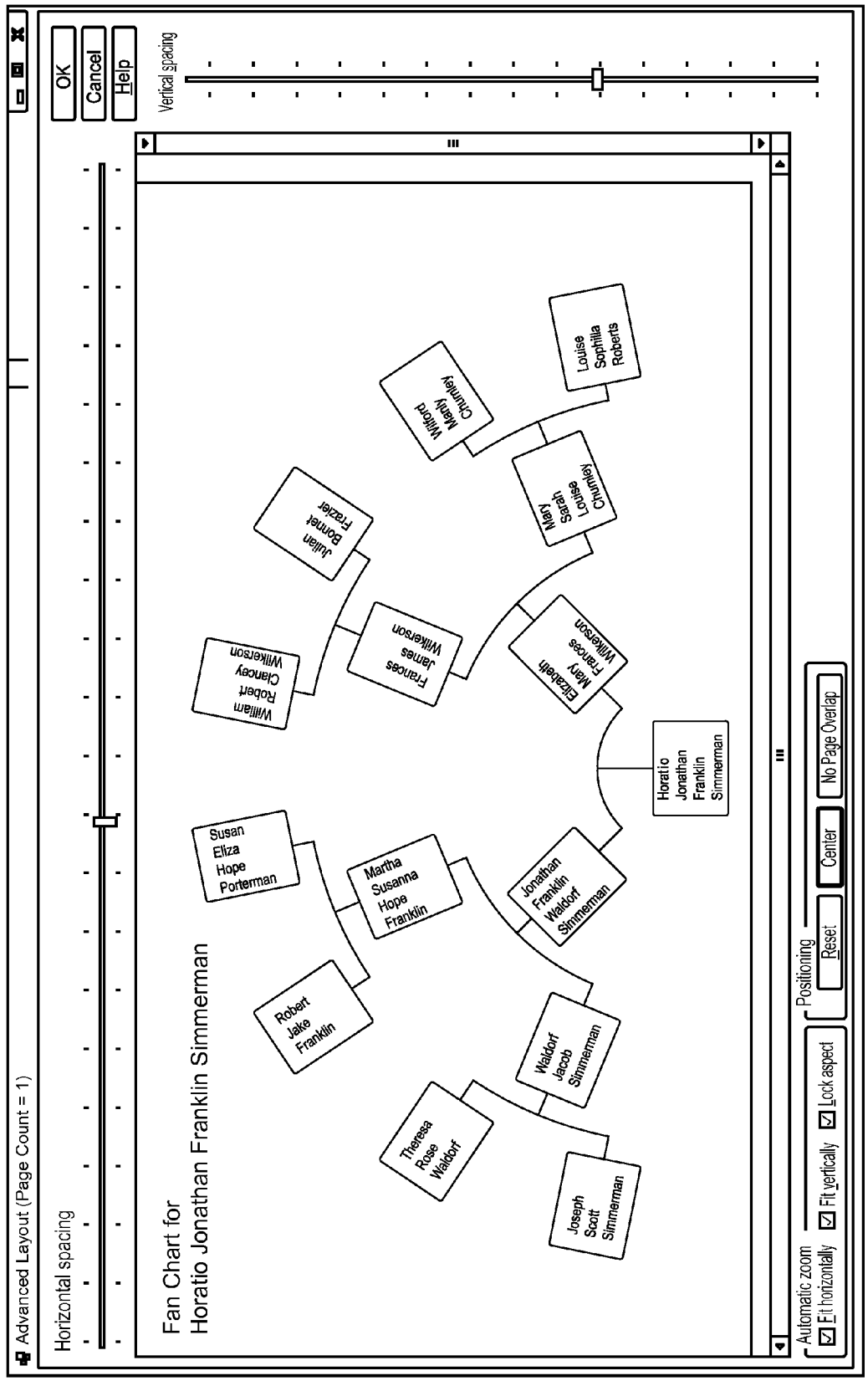
Figure 6C:
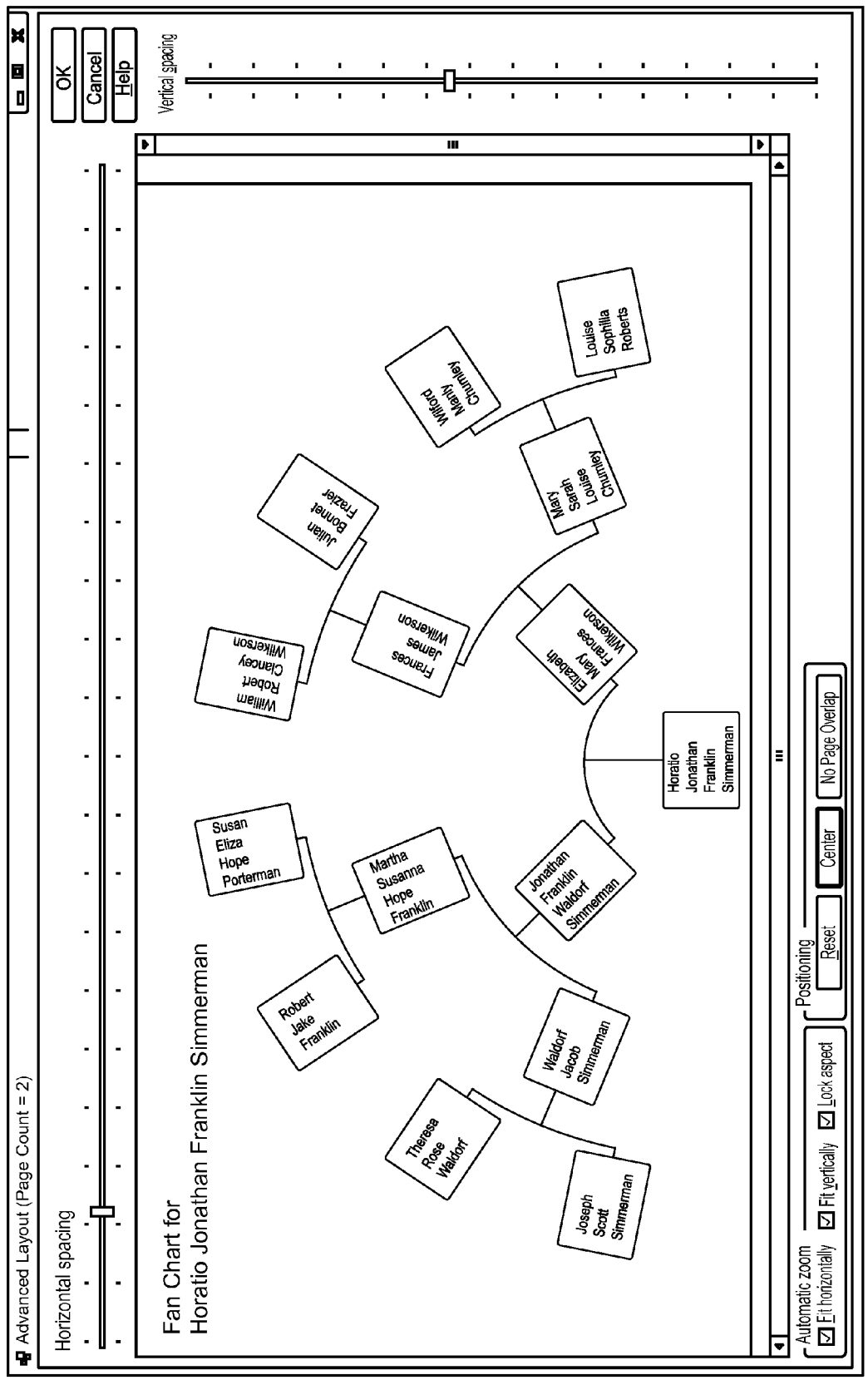

FIG. 6A shows a fan chart with vertical and horizontal sliders. FIG. 6B shows a fan chart with horizontal spacing changes, and FIG. 6C shows a fan chart with vertical spacing changes. Furthermore, aspects of the present invention may be implemented with any chart that has nodes that have horizontal and/or vertical space between the nodes of the chart.

Figure 7:
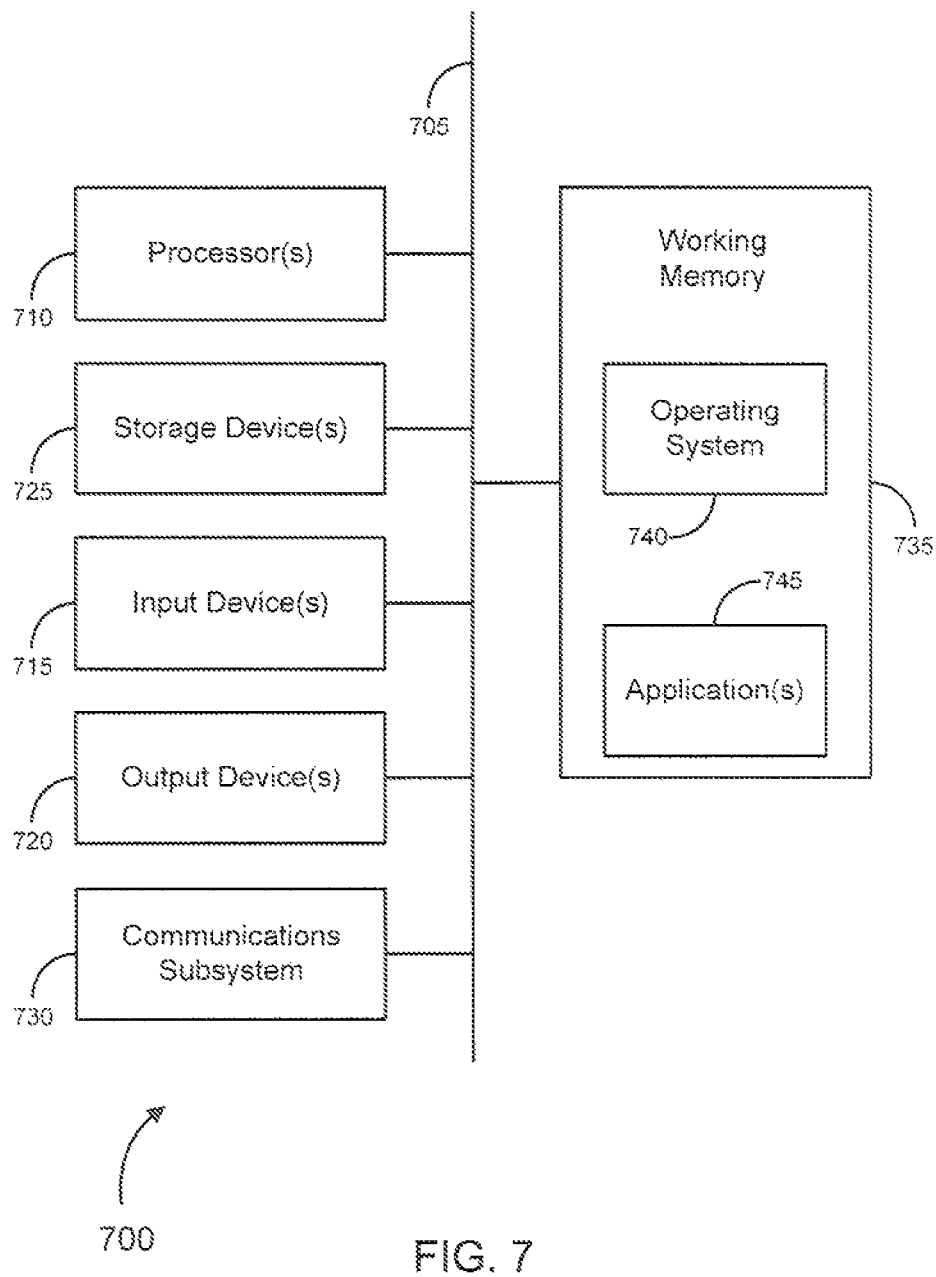
FIG. 7 is a generalized schematic diagram illustrating a computer system for implementing aspects of the present invention.

FIG. 7 provides a schematic illustration of one embodiment of a computer system 700 that can perform the methods of the invention, as described herein. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including without limitation, one or more general purpose processors and/or one or more special purpose processors (such as digital signal processing chips, graphics acceleration chips, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 700 might also include a communications subsystem 730, which can include without limitation a modem, a network card (wireless or wired), an infrared communication device, a wireless communication device and/or chipset (such as a Bluetooth™ device, an 702.11 device, a WiFi device, a WiMax device, cellular communication facilities, etc.), and/or the like. The communications subsystem 730 may permit data to be exchanged with a network (such as the network described below, to name one example), and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740 and/or other code, such as one or more application programs 745, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media.

Non-volatile media includes, for example, optical or magnetic disks, such as the storage device(s) 725. Volatile media includes, without limitation, dynamic memory, such as the working memory 735. Transmission media includes coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc., carried by the signals) to the working memory 735, from which the processor(s) 710 retrieves and executes the instructions. The instructions received by the working memory 735 may optionally be stored on a storage device 725 either before or after execution by the processor(s) 710.

Figure 8:
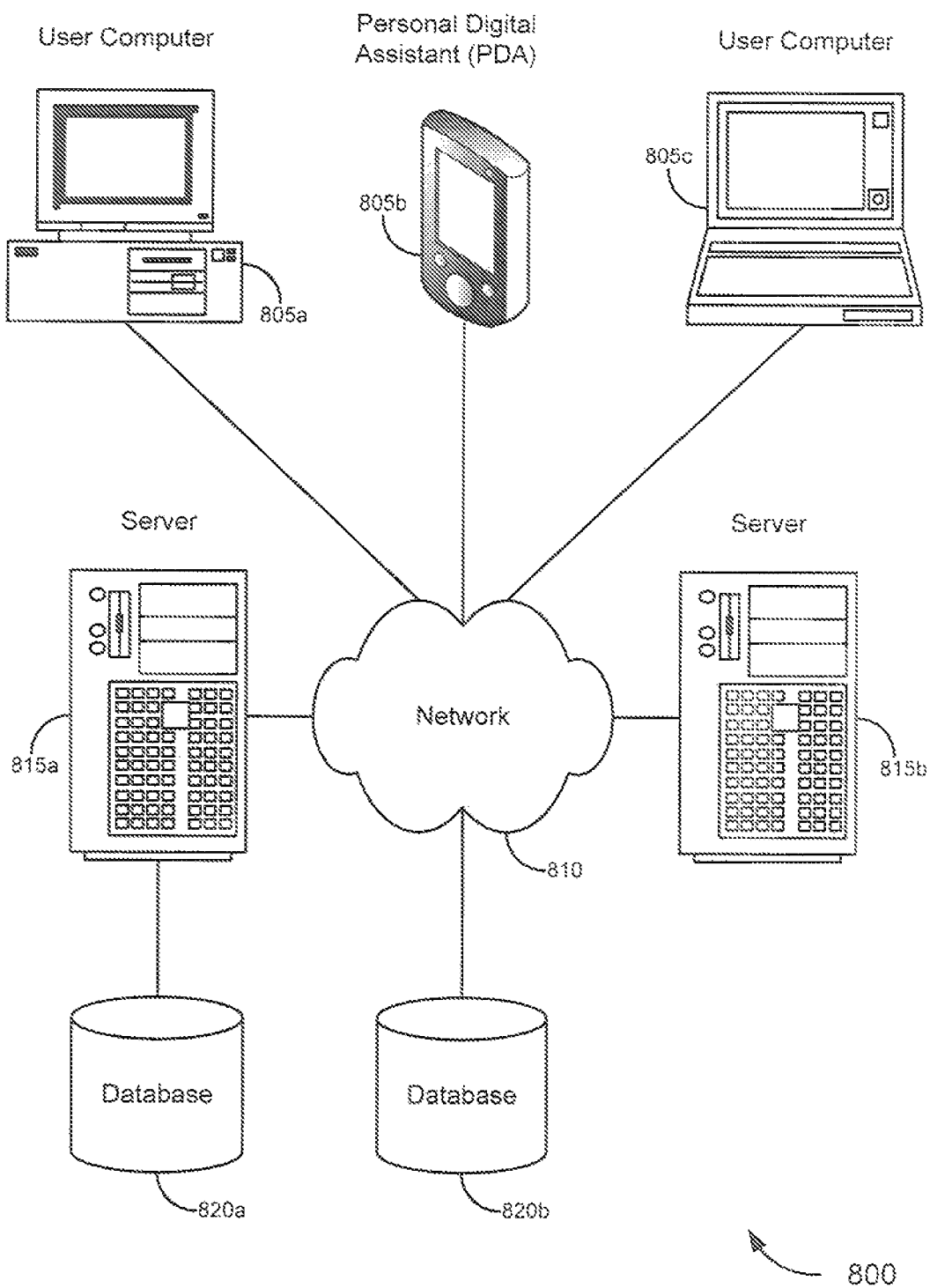
FIG. 8 is a block diagram illustrating a networked system of computers for implementing aspects of the present invention.

Merely by way of example, FIG. 8 illustrates a schematic diagram of a system 800 that can be used in accordance with one set of embodiments. The system 800 can include one or more user computers 805. The user computers 805 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 805 can also have any of a variety of applications, including one or more applications configured to perform methods of the invention, as well as one or more office applications, database client and/or server applications, and web browser applications. Alternatively, the user computers 805 can be any other electronic device, such as a thin-client computer, Internet-enabled mobile telephone, and/or personal digital assistant (PDA), capable of communicating via a network (e.g., the network 810 described below) and/or displaying and navigating web pages or other types of electronic documents. Although the exemplary system 800 is shown with three user computers 805, any number of user computers can be supported.

Certain embodiments of the invention operate in a networked environment, which can include a network 810. The network 810 can be any type of network familiar to those skilled in the art that can support data communications using any of a variety of commercially available protocols, including without limitation TCP/IP, SNA, IPX, AppleTalk, and the like. Merely by way of example, the network 810 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 805 to perform methods of the invention.

The server computers 815, in some embodiments, might include one or more application servers, which can include one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 805 and/or another server 815. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement methods of the invention incorporated by an application running on a user computer 805 and/or another server 815. Alternatively, as those skilled in the art will appreciate, a file server can include all necessary files, allowing such an application to be invoked remotely by a user computer 805 and/or server 815. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary. Merely by way of example, a database 820*a* might reside on a storage medium local to (and/or resident in) a server 815*a* (and/or a user computer 805). Alternatively, a database 820*b* can be remote from any or all of the computers 805, 815, so long as the database can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle™ database, that is adapted to store, update, and retrieve data in response to SQL-formatted commands. The database might be controlled and/or maintained by a database server, as described above, for example.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for implementing interactive modification of spacing constraints of genealogical charts having interconnected nodes reflecting familial lineage connections, the method comprising:

displaying, on a display device of a computer system, a user interface for displaying one or more genealogical charts including two or more nodes arranged in a plurality of rows, wherein the user interface includes a single horizontal slider and a single vertical slider for manipulating the one or more genealogical charts' physical space requirements by way of inter-node spacing adjustment, including independent adjustment of horizontal spacing between all nodes of a displayed genealogical chart using the horizontal slider and independent adjustment of the vertical spacing between all nodes of a displayed genealogical chart using the vertical slider, and wherein the one or more genealogical charts include page breaks representing a number of pages and representing the breaks of each of the relationship breaks of each node within the genealogical charts, and wherein the page breaks occur at relationship breaks of the nodes;

receiving, from an input device of the computer system, manipulation input for one or more of the vertical slider or the horizontal slider; and in response to receiving the manipulation input, providing real-time graphical feedback representing the manipulation of the inter-node spacing in the display of the one or more genealogical charts, wherein the real-time graphical feedback includes expanding and/or contracting the one or more genealogical charts such that the number of pages for the one or more genealogical charts is automatically increased or decreased to accommodate the size of the one or more genealogical charts, and wherein the manipulating the physical space requirements by way of inter-node spacing adjustment of the one or more genealogical charts includes increasing or decreasing the physical spacing between each node of the chart at the relationship breaks of each node in relation to the manipulation input, the physical spacing independently adjusted horizontally and vertically by manipulating the horizontal slider and the vertical slider;

wherein the two or more nodes are displayed on the display device in a fan chart configuration such that a particular row of the plurality of rows comprises a first node at a first end that is located at the same vertical position as a second node at a second end, and each remaining node between the first node and the second node in the particular row is located at a higher vertical position than the first node and the second node;

wherein the first node and the second node do not move in response to receiving the manipulation input.

2. The method for implementing interactive modification of spacing constraints of genealogical charts as in claim 1, wherein the real-time graphical feedback further includes automatically panning and/or zooming the one or more genealogical charts to accommodate expanding and/or contracting from the manipulation input.

3. The method for implementing interactive modification of spacing constraints of genealogical charts as in claim 1, wherein the user interface further includes a rotational slider.

4. The method for implementing interactive modification of spacing constraints of genealogical charts as in claim 3, wherein the rotational slider is configured to rotate the one or more genealogical charts on a 360 degree axis.

5. The method for implementing interactive modification of spacing constraints of genealogical charts as in claim 1, wherein the user interface further includes automatic zoom functionality.

6. The method for implementing interactive modification of spacing constraints of genealogical charts as in claim 5, wherein the automatic zoom functionality includes one or more of the following: horizontal fit, vertical fit, and the aspect lock.

7. The method for implementing interactive modification of spacing constraints of genealogical charts as in claim 6, wherein the horizontal fit and the vertical fit, when toggled, are configured to force the one or more genealogical charts to automatically adjust either vertically or horizontally to fit on a page.

8. The method for implementing interactive modification of spacing constraints of genealogical charts as in claim 6, wherein the aspect lock, when toggled, is configured to lock the aspect of the two or more nodes of the one or more genealogical charts.

9. The method for implementing interactive modification of spacing constraints of genealogical charts as in claim 1, wherein the two or more nodes are connected using a directed graph.

10. The method for implementing interactive modification of spacing constraints of genealogical charts as in claim 1, the user interface comprises a web-based user interface.

11. The method for implementing interactive modification of spacing constraints of genealogical charts as in claim 1, wherein the user interface further includes a reset button.

12. The method for implementing interactive modification of spacing constraints of genealogical charts as in claim 11, wherein the reset button is configured to reverse the manipulation input received from the vertical slider and the horizontal slider.

13. A non-transitory computer readable storage medium having a computer-readable program embodied therein for directing operation of a computer system, including a processor and a storage device, wherein the computer-readable program includes instructions for operation the computers system to:

displaying, on a display device of a computer system, a user interface for displaying one or more genealogical charts including two or more nodes arranged in a plurality of rows, each displayed genealogical chart having interconnected nodes reflecting familial lineage connections, wherein the user interface includes a single horizontal slider and a single vertical slider for manipulating the one or more genealogical charts' physical space requirements by way of inter-node spacing adjustment, including independent adjustment of horizontal spacing between all nodes of the displayed genealogical chart using the horizontal slider and independent adjustment of the vertical spacing between all nodes of the displayed genealogical chart using the vertical slider, and wherein the one or more genealogical charts include page breaks representing a number of pages and representing the breaks of each of the relationship breaks of each node within the genealogical charts, and wherein the page breaks occur at relationship breaks of the nodes;

receiving, from an input device of the computer system, manipulation input for one or more of the vertical slider or the horizontal slider; and in response to receiving the manipulation input, providing real-time graphical feedback representing the manipulation of the inter-node spacing in the display of the one or more genealogical charts, wherein the real-time graphical feedback includes automatically panning and/or zooming the one or more genealogical charts to accommodate expanding and/or contracting from the manipulation input, and wherein the manipulating the physical space requirements by way of inter-node spacing adjustment of the one or more genealogical charts includes increasing or decreasing the physical spacing between each node of the chart at the relationship breaks of each node in relation to the manipulation input, the physical spacing independently adjusted horizontally and vertically by manipulating the horizontal slider and the vertical slider;

wherein the two or more nodes are displayed on the display device in a fan chart configuration such that a particular row of the plurality of rows comprises a first node at a first end that is located at the same vertical position as a second node at a second end, and each remaining node between the first node and the second node in the particular row is located at a higher vertical position than the first node and the second node;

wherein the first node and the second node do not move in response to receiving the manipulation input.

14. The non-transitory computer readable storage medium for implementing interactive modification of spacing constraints of genealogical charts as in claim 13, wherein the user interface further includes a rotational slider.

15. The non-transitory computer readable storage medium for implementing interactive modification of spacing constraints of genealogical charts as in claim 14, wherein the rotational slider is configured to rotate the one or more genealogical charts on a 360 degree axis.

16. The non-transitory computer readable storage medium for implementing interactive modification of spacing constraints of genealogical charts as in claim 13, wherein the user interface further includes automatic zoom functionality.

17. The non-transitory computer readable storage medium for implementing interactive modification of spacing constraints of genealogical charts as in claim 16, wherein the automatic zoom functionality includes one or more of the following: horizontal fit, vertical fit, and the aspect lock.

18. The non-transitory computer readable storage medium for implementing interactive modification of spacing constraints of genealogical charts as in claim 17, wherein the horizontal fit and the vertical fit, when toggled, are configured to force the one or more genealogical charts to automatically adjust either vertically or horizontally to fit on a page.

19. The non-transitory computer readable storage medium for implementing interactive modification of spacing constraints of genealogical charts as in claim 17, wherein the aspect lock, when toggled, is configured to lock the aspect of the two or more nodes of the one or more genealogical charts.

\* \* \* \* \*